(12) United States Patent
Kaderabek

(10) Patent No.: US 6,428,047 B1
(45) Date of Patent: Aug. 6, 2002

(54) COMBINE HEADER TRANSPORT TRAILER

(76) Inventor: Joseph J. Kaderabek, 713 Road 20, Ohiowa, NE (US) 68416

( * ) Notice: Subject to any disclaimer, the term of this patent is extended or adjusted under 35 U.S.C. 154(b) by 0 days.

(21) Appl. No.: 09/505,113

(22) Filed: Feb. 16, 2000

(51) Int. Cl.[7] .............................................. B62D 63/06
(52) U.S. Cl. ...................... 280/789; 280/781; 414/470; 410/2
(58) Field of Search ................................ 280/789, 781; 414/470; 298/17.6, 17.7; 410/2

(56) References Cited

U.S. PATENT DOCUMENTS

| 3,655,218 | A | 4/1972 | Taylor | 280/179 |
|---|---|---|---|---|
| 4,242,031 | A | 12/1980 | McMullen | 414/470 |
| 4,371,299 | A | 2/1983 | Cain et al. | 410/44 |
| 4,558,560 | A | 12/1985 | Koch | 56/228 |
| 5,040,825 | A | 8/1991 | Kuhns | 280/789 |
| D331,413 | S | 12/1992 | Danner et al. | D15/27 |
| 5,333,904 | A | 8/1994 | Kuhns | 280/789 |
| 5,642,607 | A | 7/1997 | Stephenson et al. | 56/15.1 |
| 5,785,472 | A | 7/1998 | Smith et al. | 410/77 |
| 5,909,989 | A | 6/1999 | Bauer et al. | 410/44 |

Primary Examiner—Kenneth R. Rice
Assistant Examiner—Christopher Buchanan
(74) Attorney, Agent, or Firm—Thomte, Mazour & Niebergall; Dennis L. Thomte

(57) ABSTRACT

A combine header transport trailer including a wheeled frame for endwise transport of a combine header. An elongated header support bar is positioned at one side of the trailer and is normally supported upon a pair of posts or supports which extend upwardly from one of the frame members of the trailer. The header support bar is adapted to engage the underside of the header adjacent the forward end thereof. The lower rearward end of the header is supported upon a pair of brackets. The header support bar and the brackets are positioned at opposite ends of pivot arms which are adapted to pivotally move the combine header from a substantially horizontally disposed position to a substantially vertically disposed position. As the header is pivoted to its substantially vertically disposed position, the lower end of the header moves inwardly with respect to the trailer to stabilize the trailer by centering the weight of the header on the trailer.

7 Claims, 6 Drawing Sheets

COMBINE HEADER TRANSPORT TRAILER

BACKGROUND OF THE INVENTION

1. Field of the Invention

This invention relates to a combine header transport trailer and more particularly to a combine header transport trailer which is adapted to raise the combine header from a substantially horizontal position to a substantially vertical position through the use of hydraulic cylinders.

2. Description of the Related Art

Combine header transport trailers have been utilized for several years for transporting combine headers, after they have been removed from the combine, from one location to another. It is desirable to be able to detach the headers from the combine so that the combine and the header may be separately moved over roads from one location to another. If the header is not removed from the combine, the width of the header makes it extremely hazardous to transport the combine from one location to another.

In most of the prior art combine header transport trailers, the header is positioned endwise on the trailer with the lower rearward end of the header being supported on a pair of backstops or brackets and with the underside of the header being supported by a longitudinally extending bar or frame member. Some provision has been made in the prior art combine header transport trailers for vertically adjusting the header support bar or frame members. However, to the best of applicant's knowledge, the prior art trailers are only able to vertically adjust the header support frame member to a small degree. If the header requires repair, the repair person must either crawl beneath the header while it is supported on the combine in a raised position or must crawl beneath the trailer if the header is supported on the header transport trailer. The repair of the headers is therefore made quite difficult. Further, if the headers are to be stored on the trailers during the off-season, the header normally extends some distance from at least one side of the trailer which requires considerable space if the trailer and header are to be stored inside a building or the like.

SUMMARY OF THE INVENTION

A trailer is described for endwise transport of a combine header having an underside and a lower rearward end. The trailer includes an elongated wheeled frame having a rearward end, a forward end, and first and second sides. A forward cross member is secured to the wheeled frame rearwardly of the forward end thereof while a rearward cross member is secured to the wheeled frame forwardly of the rearward end thereof and which also has opposite ends. A front slide member is slidably mounted on the forward cross member inwardly of one end thereof and is movable between inner and outer positions. A first elongated arm, having first and second ends, is pivotally connected at its first end to the front slide member. A second elongated arm, having first and second ends, is pivotally connected at its first end to the front cross member inwardly of the front slide member and is pivotally connected at its second end to the first arm intermediate the length thereof. A front hydraulic cylinder is operatively secured to the front slide for moving the front slide member between its inner and outer positions. A backstop is secured to the first arm member adjacent its first end for engagement with the lower rearward end of the header. A rear slide member is slidably mounted on the rearward cross member inwardly of one end thereof and is movable between inner and outer positions. A third elongated arm, having first and second ends, is pivotally connected at its first end to the rear slide member. A fourth elongated arm, having first and second ends, is pivotally connected at its first end to the rear cross member inwardly of the rear slide member and is pivotally connected at its second end to the third arm intermediate the length thereof. A rear hydraulic cylinder is operatively secured to the rear slide member for moving the rear slide member between its inner and outer positions. A backstop is secured to the third arm member adjacent its first end for engagement with the lower rearward end of the header. An elongated header support bar is secured to and extends between the second ends of the first arm members for engagement with the underside of the header. The front and rear hydraulic cylinders cause the header support to be moved between first and second positions. When the header support is in its first position, it supports the header thereon in a generally horizontally disposed transport position. The header support, when in its second position, supports the header thereon in an inclined position to facilitate work or repairs thereon. When the header support is in its second position, the width thereof is effectively reduced so that space is saved when the trailer and header thereon are to be stored during the off-season.

It is therefore a principal object of the invention to provide an improved combine header transport trailer.

A further object of the invention is to provide a combine header transport trailer which is able to raise the combine header from a substantially horizontal position to a substantially vertical position by a pair of hydraulic cylinders.

A further object of the invention is to provide a combine header transport trailer which enables the header to be positioned in a substantially vertical position so that work may be performed on the underside of the header in a more convenient fashion.

Still another object of the invention is to provide a combine header transport trailer including a header support bar wherein extensions may be selectively secured to the forward and rearward ends thereof to accommodate various header lengths.

Still another object of the invention is to provide a combine header transport trailer which is durable in use, safe to use, and easy to use.

These and other objects of the invention will be apparent to those skilled in the art.

DESCRIPTION OF THE PREFERRED EMBODIMENT

Figure 1:
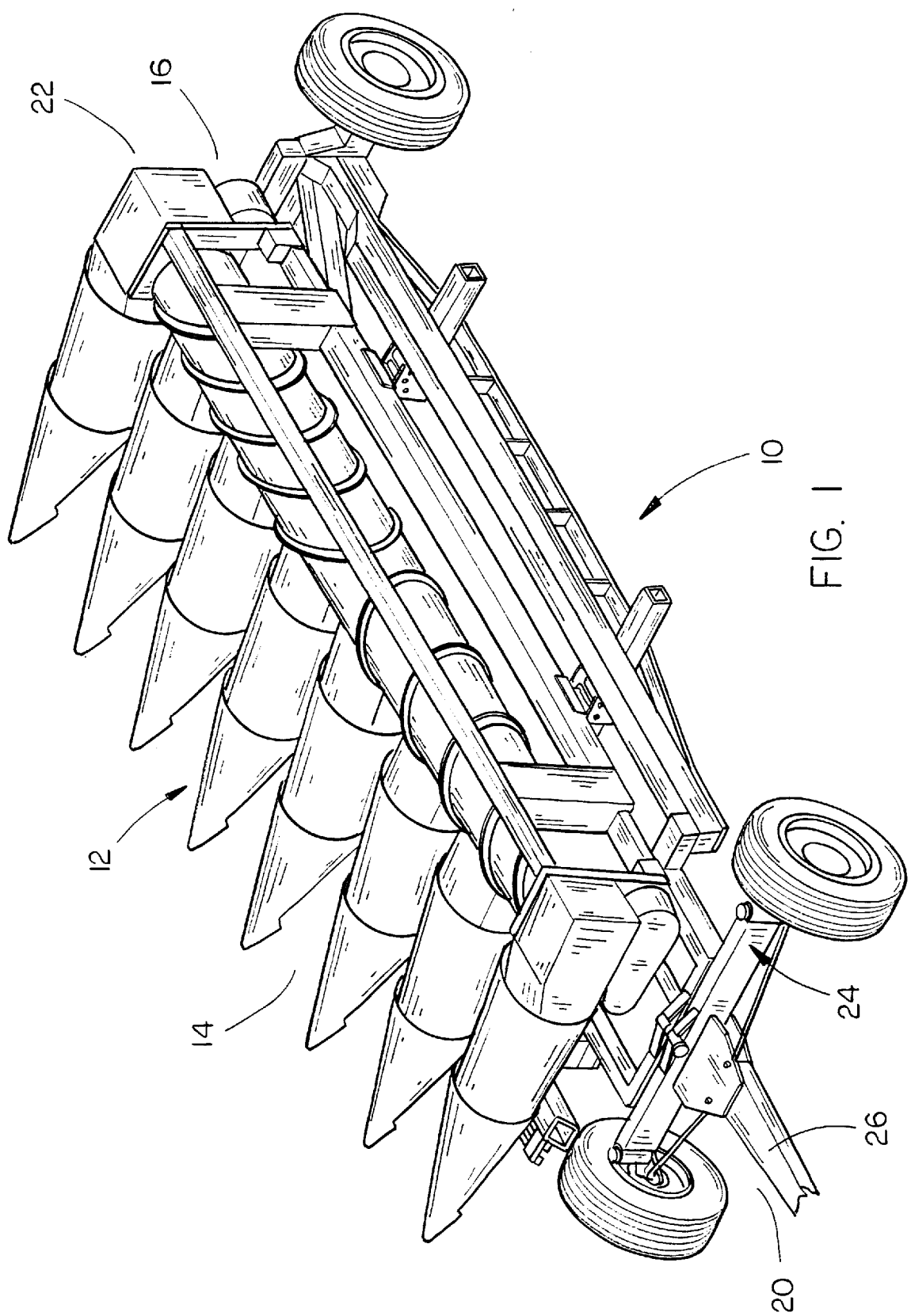
FIG. 1 is a perspective view illustrating a combine header supported on the trailer of this invention.

The numeral 10 refers to the combine header transport trailer of this invention which is adapted to support and/or transport a combine header 12. For purposes of description, the combine header 12 will be described as including a forward end 14, a rearward end 16, and an underside 18. Also for purposes of description, the trailer 10 will be described as having a forward end 20 and a rearward end 22.

Figure 2:
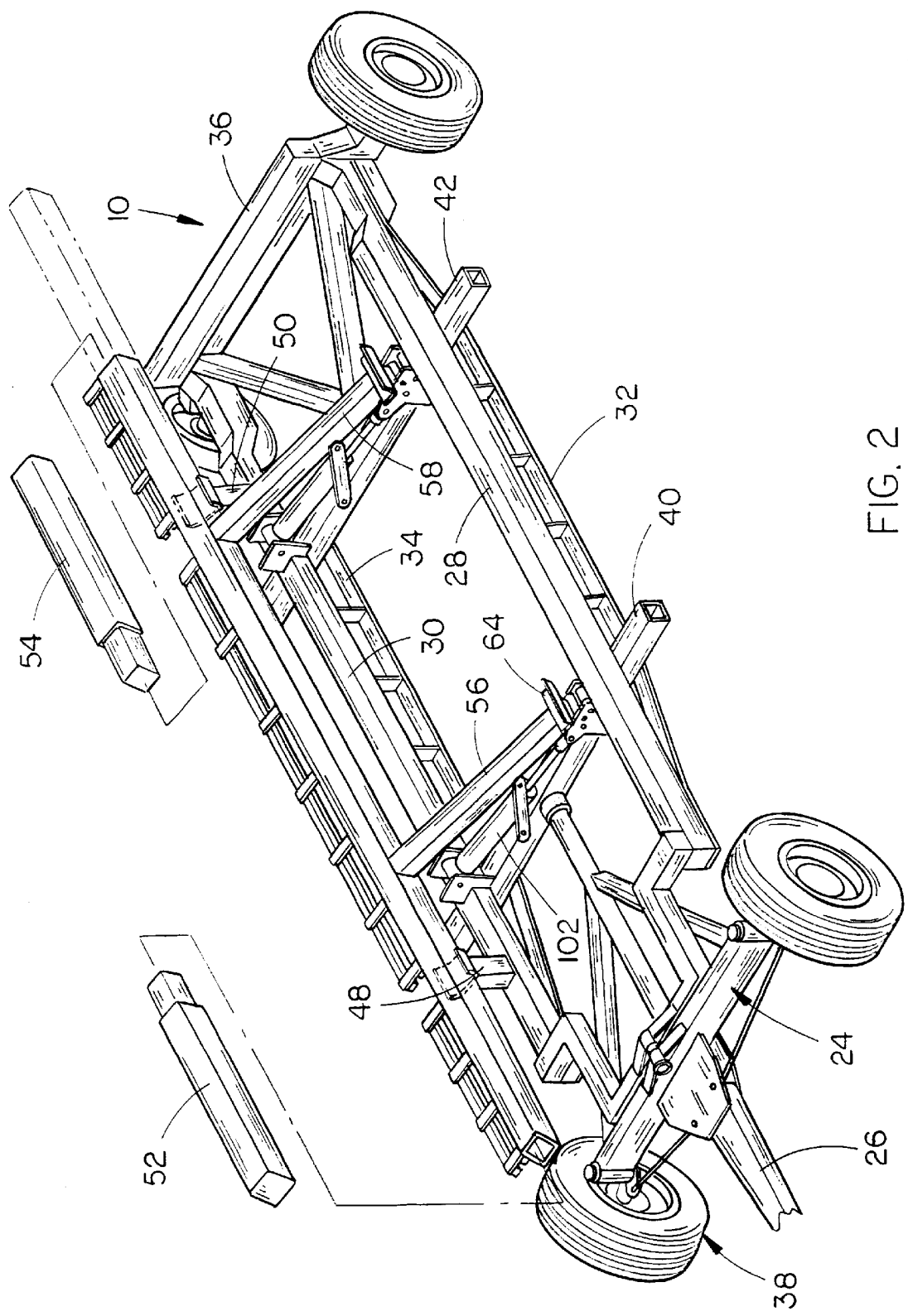
FIG. 2 is a perspective view of the trailer of this invention with the drawing illustrating extensions which are able to be placed in the ends of an elongated header support bar.

Trailer 10 generally comprises a wheeled frame means 24 having a tongue 26 extending forwardly therefrom which is adapted to be connected to a prime mover such as a tractor or truck. Trailer 10 includes longitudinally extending frame members 28 and 30 which have truss-like supports 32 and 34 provided on the underside thereof, respectively, for strengthening purposes. Cross member 36 is secured to and extends between the rearward ends of frame members 28 and 30, as seen in FIG. 2. A conventional front wheel assembly 38 is provided at the forward end of the trailer to enable the trailer to be moved in conventional fashion. Trailer 10 also includes a pair of cross frame members 40 and 42 which are welded to frame members 28 and 30 at the undersides thereof and which extend therebetween. As seen in the drawings, the outer ends of the cross frame members 40 and 42 extend outwardly of the frame members 28 and 30 to enable jacks 44 to be utilized therewith for stabilizing the trailer during times that the header has been elevated to the position of FIG. 4, as will be described hereinafter.

The numeral 46 refers to an elongated header support which is normally supported upon a pair of supports 48 and 50 which are secured to frame member 30 and which extend outwardly therefrom. The ends of the support 46 are hollow to enable the extensions 52 and 54 to be inserted in the forward and rearward ends thereof, as desired, during those times when an extremely long (wide) header is being supported or transported by the trailer.

Figure 5:
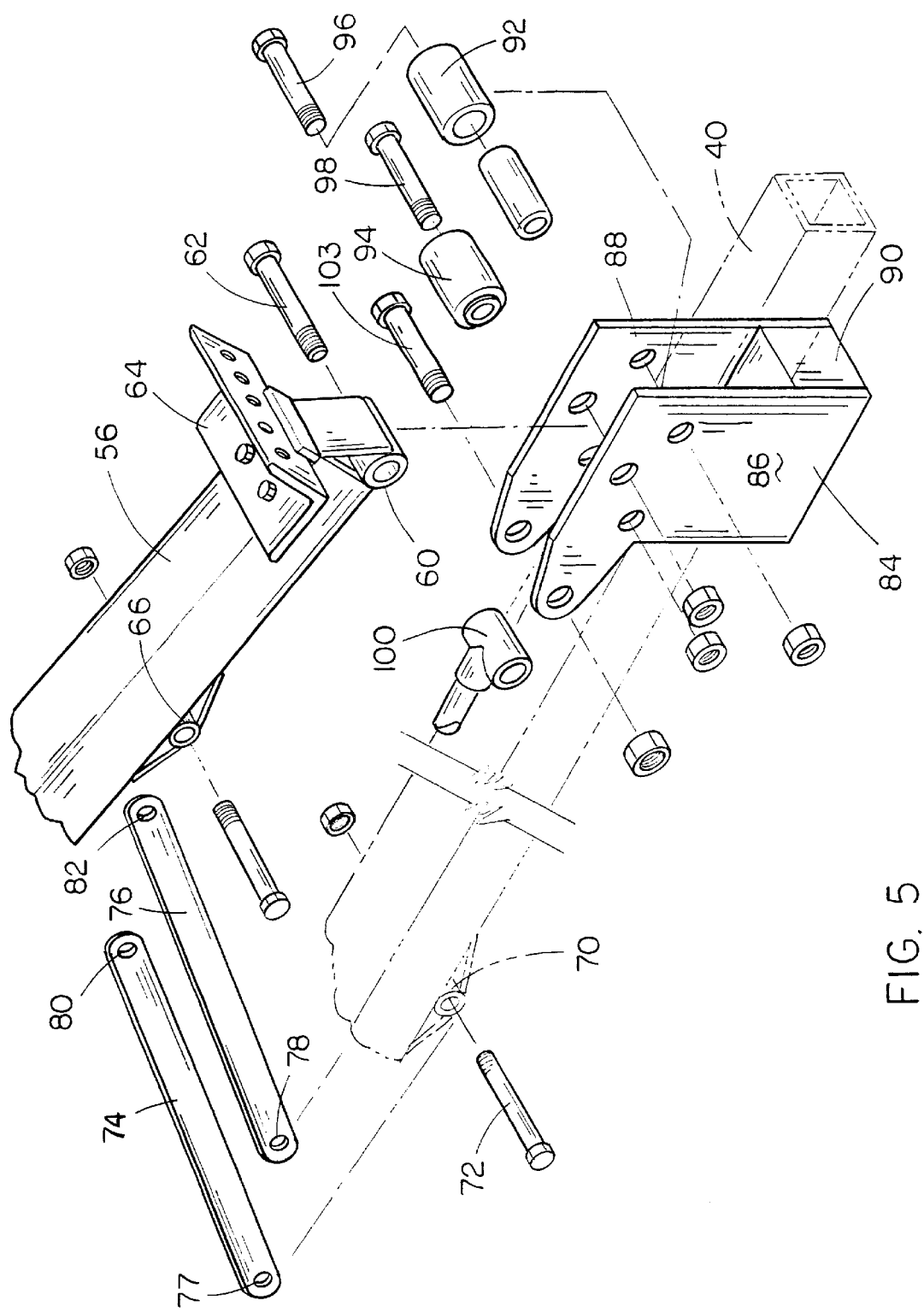
FIG. 5 is a partial exploded perspective view illustrating certain pivotal connections.
Figure 6:
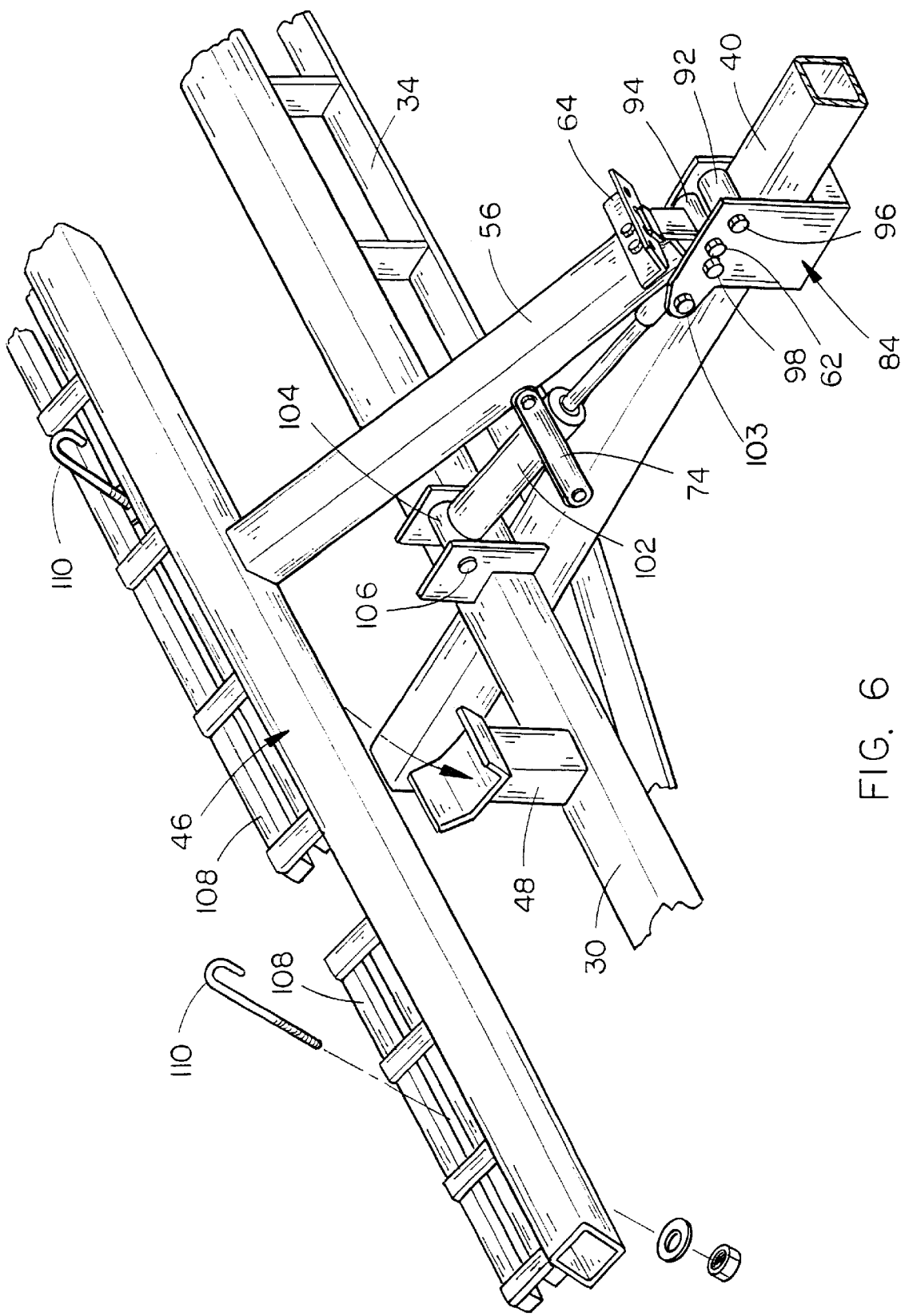
FIG. 6 is a partial perspective view illustrating the manner in which the header support bar is pivotally secured to the trailer.

A pair of arms or frames 56 and 58 are secured to header support 46 by welding or the like and extend transversely therefrom for a pivotal connection to the trailer. Although it is preferred that a pair of the arms 56 and 58 be utilized, more than two of the frames could be utilized, if so desired. Inasmuch as each of the frames 56 and 58 are pivoted to the trailer in an identical fashion, only the pivotal connection of frame 56 will be described as follows. As seen in FIG. 5, the lower end of frame 56 is provided with a pivot tube 60 which is adapted to receive bolt 62 therein. Angle bracket 64 is secured to the lower end of frame 56 and is adapted to be secured to the lower rearward end of the header 12, as will be described hereinafter. The configuration of angle bracket 64 will change or vary depending upon the particular type or model of header being supported or transported. The underside of frame 56 also has a pivot tube 66 secured thereto above its lower end which is adapted to receive a bolt 68 therein. As also seen in FIG. 5, the underside of cross frame 40 has a pivot tube 70 secured thereto which is adapted to receive a bolt 72 therein. The lower ends of arms or links 74 and 76 are positioned at the opposite ends of the pivot tube 70 with the bolt 72 extending through opening 77 in arm 74, through pivot tube 70, and through opening 78 in arm 76. The upper ends of arms 74 and 76 are positioned at the opposite ends of pivot tube 66 with the bolt 68 extending through opening 80 in arm 74, through pivot tube 66, and through opening 82 in arm 76.

The numeral 84 refers to a support which is slidably mounted on cross frame 40 and which includes plates 86 and 88 and bottom portion 90. Plate 86 is positioned at the forward side of cross frame 40 while plate 88 is positioned at the rearward side of cross frame 40 and with the bottom portion 90 being positioned beneath cross frame 40. A pair of rollers 92 and 94 are positioned between plates 86 and 88 above cross frame 40 for engagement with the upper surface of cross frame 40. Bolts 96 and 98 extend through plate 88, through rollers 92 and 94, and through plate 86 to maintain the rollers in position.

Figure 3:
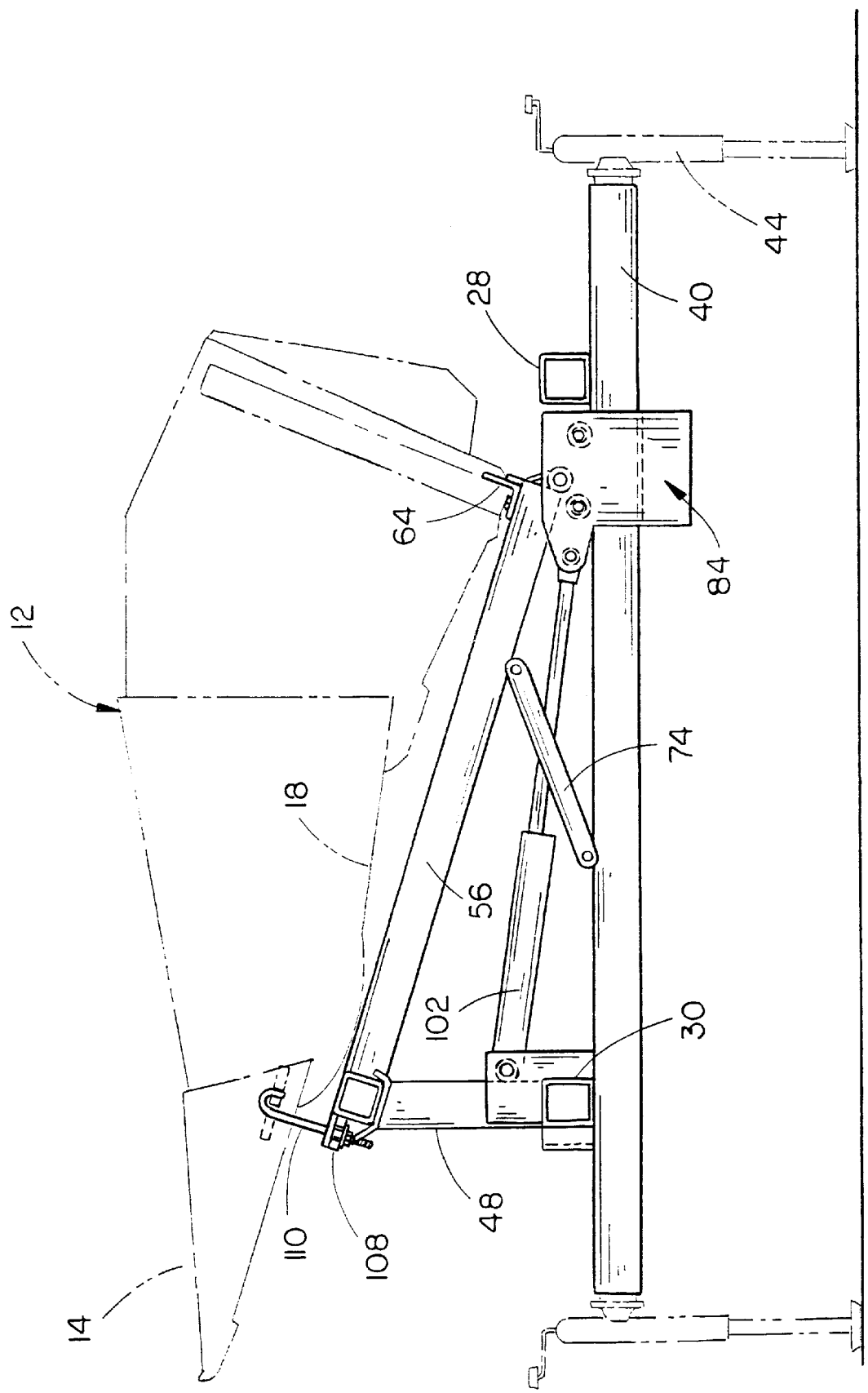
FIG. 3 is a front view of the trailer, with the wheels removed for purposes of clarity, illustrating the use of jacks for stabilizing the outer ends of cross frame members.

Pivot tube 60 is positioned between plates 86 and 88 and is maintained therein by means of bolt 62. Rod end 100 of hydraulic cylinder 102 is pivotally secured to the upper inner end of plates 86 and 88 by means of bolt 103. The base end 104 of hydraulic cylinder 102 is pivotally connected to frame member 30 by means of bolt 106. Thus, assuming that header support 46 is supported upon the supports 48 and 50, retraction of the cylinder rod of cylinder 102 causes the support 84 to be pulled towards frame member 30 with the arms 74 and 76 causing the header support 46 to be raised from the position of FIG. 3 to the position of FIG. 4. Conversely, extension of cylinder 102 causes the header support 46 to be moved from the position of FIG. 4 to the position of FIG. 3. The outer side of header support 46 has header attachments 108 provided thereon.

Figure 4:
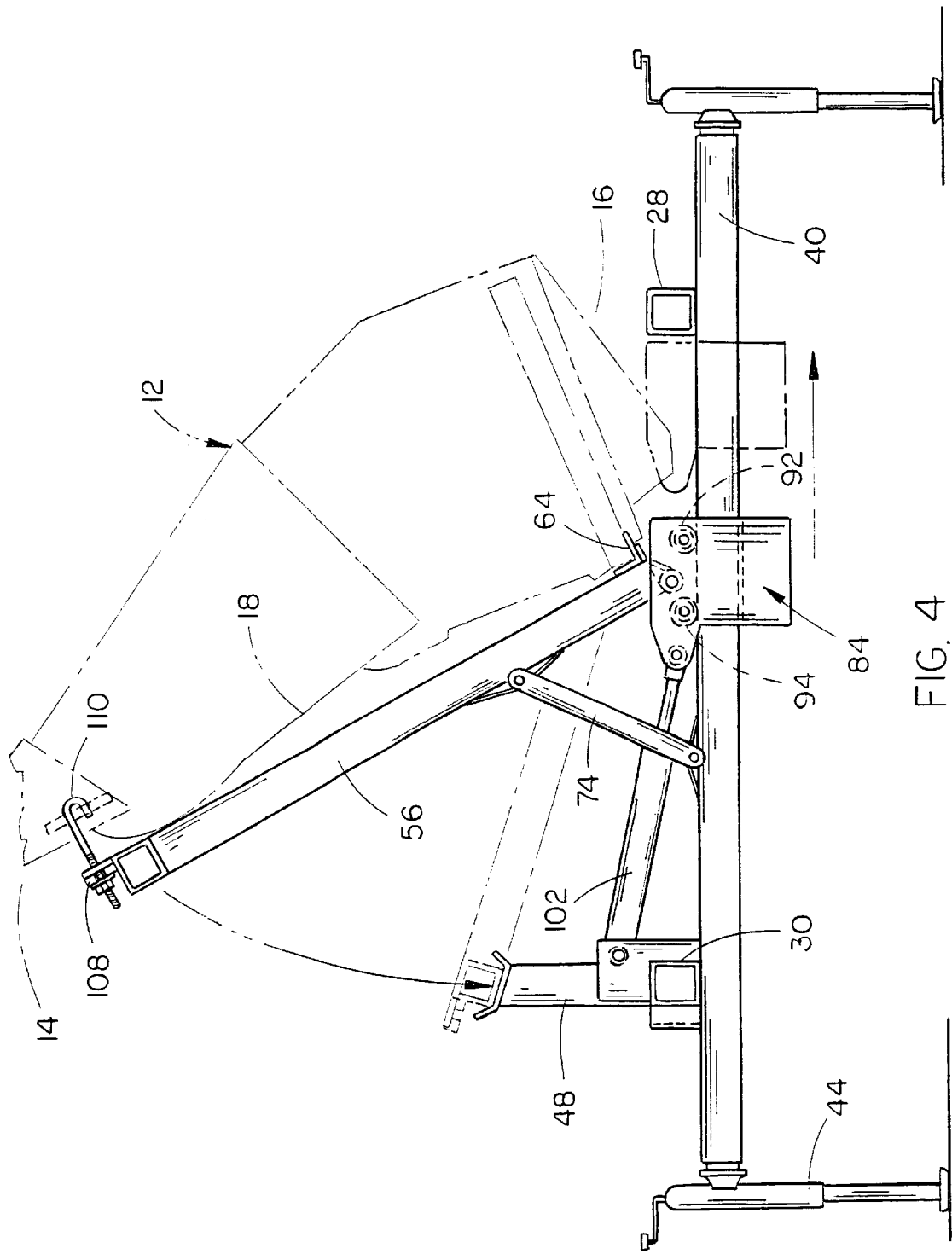
FIG. 4 is a view similar to FIG. 3 except that the header has been raised from the position of FIG. 3.

Thus, when it is desired to transport the header 12 or to repair the same, the combine is driven at right angles to the trailer with the header 12 being raised above trailer 10 to enable the header 12 to be positioned as illustrated in FIG. 1. The header 12 is lowered onto the trailer so that the lower rearward end of the header 12 is supported by the bracket 64 and so that the header support 46 supports the underside of the forward end of the header 12. The lower rearward end of the header 12 is secured to the bracket 64 by bolts or the like. The forward end of header 12 is secured to header support 46 by means of J-bolts 110 or any other convenient means. The combine is then disconnected from the header 12 so that the combine and header may be separately transported, if desired. With the header 12 securely mounted on the trailer 10, the trailer 10 can be utilized to transport the header 12 from one location to another. If it is desired to repair the header 12, the hydraulic cylinder 102 may be actuated so that the header 12 is substantially vertically disposed, as illustrated in FIG. 4. The fact that the header 12 is in its substantially vertically disposed position enables the farmer to comfortably work on the underside of the header to repair or replace portions thereof. As the header 12 is moved to its substantially vertically disposed position, the supports 84 move inwardly on the cross frames 40 which moves the lower end of the header inwardly with respect to the trailer so that the weight of the header is moved towards the center of the trailer to stabilize the trailer. Further, when the header is in its upright position, it is recommended that block members be positioned between the supports 84 and the trailer frame to prevent the header from inadvertently moving to its horizontally disposed position. Use of the jacks 44 stabilizes the trailer during the times that the farmer is working on the header. Further, if it is desired to store the header on the trailer in a building or the like, the header would be pivoted to the position of FIG. 4 so as to occupy less space.

Thus it can be seen that the invention accomplishes at least all of its stated objectives.

I claim:

1. A trailer for endwise transport of a combine header having an underside and a lower rearward end, comprising:
   an elongated wheeled frame, a rearward end, a forward end, and first and second sides;
   a forward cross member secured to said wheeled frame rearwardly of the forward end thereof and having opposite ends;
   a front slide member slidably mounted on said forward cross member inwardly of one end thereof and being movable between inner and outer positions;

a first elongated arm, having first and second ends, pivotally connected at its said first end to said front slide member;

a second elongated arm, having first and second ends, pivotally connected at its said first end to said front cross member inwardly of said front slide member and pivotally connected at its said second end to said first arm intermediate the length thereof;

a front hydraulic cylinder operatively secured to said front slide for moving said front slide member between its said inner and outer positions;

a rearward cross member secured to said wheeled frame forwardly of the rearward end thereof and having opposite ends;

a rear slide member slidably mounted on said rearward cross member inwardly of one end thereof and being movable between inner and outer positions;

a third elongated arm, having first and second ends, pivotally connected at its said first end to said rear slide member;

a fourth elongated arm, having first and second ends, pivotally connected at its said first end to said rear cross member inwardly of said rear slide member and pivotally connected at its said second end to said third arm intermediate the length thereof;

a rear hydraulic cylinder operatively secured to said rear slide member for moving said rear slide member between its said inner and outer positions;

a rearward cross member secured to said wheeled frame forwardly of the rearward end thereof and having opposite ends;

an elongated header support secured to and extending between said second ends of said first and third arms for supporting the header thereon;

a first header stop on said first arm adjacent said first end thereof;

a second header stop on said third arm adjacent said first end thereof;

said first and second header stops engaging the lower rearward end of the header to support the header;

said front and rear hydraulic cylinders causing said header support to be moved between first and second positions;

said header support, when in its said first position, supporting the header thereon in a transport position;

said header support, when in its said second position, supporting the header thereon in an inclined position to facilitate work thereon.

2. The trailer of claim 1 wherein said header support comprises a tubular member having opposite ends and wherein an extension tube is selectively slidably mounted on either of the ends of said tubular member.

3. The trailer of claim 1 wherein support posts extend upwardly from the wheeled frame for supporting said header support thereon when said header support is in its said first position.

4. The trailer of claim 1 wherein said front and rear slide members are slidably moved from their said outer positions to their said inner positions when front and rear hydraulic cylinders move said header support from its said first position towards its said second position.

5. The trailer of claim 1 wherein the opposite ends of said front and rear cross members are positioned outwardly of the sides of said wheeled frame.

6. The trailer of claim 1 wherein said wheeled frame includes first and second longitudinally extending frame members which each have a support truss associated therewith.

7. The trailer of claim 1 wherein said header support includes means for connection to the underside of the header.

* * * * *